United States Patent
Mathew et al.

(10) Patent No.: US 9,245,559 B2
(45) Date of Patent: Jan. 26, 2016

(54) TRACK MISREGISTRATION SENSITIVE INITIALIZATION OF JOINT EQUALIZER

(71) Applicant: LSI Corporation, San Jose, CA (US)

(72) Inventors: George Mathew, San Jose, CA (US); Jongseung Park, Allentown, PA (US); Eui Seok Hwang, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 3 days.

(21) Appl. No.: 14/263,562

(22) Filed: Apr. 28, 2014

(65) Prior Publication Data

US 2015/0255101 A1    Sep. 10, 2015

Related U.S. Application Data

(60) Provisional application No. 61/947,873, filed on Mar. 4, 2014.

(51) Int. Cl.
| | |
|---|---|
| G11B 5/035 | (2006.01) |
| G11B 5/596 | (2006.01) |
| G11B 20/10 | (2006.01) |
| G06F 3/06 | (2006.01) |
| G11B 5/58 | (2006.01) |
| G11B 5/012 | (2006.01) |
| G11B 5/00 | (2006.01) |

(52) U.S. Cl.
CPC .......... *G11B 5/59627* (2013.01); *G06F 3/0608* (2013.01); *G06F 3/0644* (2013.01); *G06F 3/0689* (2013.01); *G11B 5/012* (2013.01); *G11B 5/58* (2013.01); *G11B 20/10009* (2013.01); *G11B 20/10046* (2013.01); *G11B 2005/0013* (2013.01)

(58) Field of Classification Search
None
See application file for complete search history.

(56) References Cited

U.S. PATENT DOCUMENTS

| | | |
|---|---|---|
| 5,636,244 A | 6/1997 | Goodson |
| 6,337,878 B1 | 1/2002 | Endres |
| 6,418,164 B1 | 7/2002 | Endres |
| 8,102,960 B2 | 1/2012 | Ran |
| 8,175,201 B2 | 5/2012 | Mathew |
| 8,532,504 B2 | 9/2013 | Wagner |
| 2006/0045176 A1 | 3/2006 | Moughabghab |
| 2014/0016688 A1 | 1/2014 | Venkataramani |
| 2014/0086298 A1 | 3/2014 | Lu |
| 2014/0105266 A1 | 4/2014 | Xia |
| 2015/0003221 A1* | 1/2015 | Sankaranarayanan et al. ................. 369/13.32 |

OTHER PUBLICATIONS

George Mathew et al., Capacity Advantage of Array-Reader Based Magnetic Recording for Next Generation Hard Disk Drives, Digests of the 24th Magnetic Recording Conference TMRC 2013, Aug. 20-22, 2013, pp. i-ii, 1, and 58-59.
Nuno Miguel De Figueiredo Garrido, Available Techniques for Magnetic Hard Disk Drive Read Channel Equalization, NM de Figueiredo Garrido, Jul. 8, 2013, pp. 1-13.

* cited by examiner

*Primary Examiner* — Muhammad N Edun

(57) ABSTRACT

A method of mitigating an effect of track misregistration on read performance in a system comprising an array-reader includes determining an estimated off-track condition, selecting translation coefficients based on the estimated off-track condition, determining updated equalizer coefficients by applying the translation coefficients to native equalizer coefficients, and applying the updated equalizer coefficients to signals received from the array-reader to output a read signal.

20 Claims, 9 Drawing Sheets

TRACK MISREGISTRATION SENSITIVE INITIALIZATION OF JOINT EQUALIZER

CROSS-REFERENCE TO RELATED APPLICATIONS

This application claims the benefit of U.S. Provisional Patent Application No. 61/947,873 filed on Mar. 4, 2014, the complete disclosure of which is expressly incorporated by reference herein in its entirety for all purposes.

FIELD OF INVENTION

The present invention relates generally to electrical and electronic circuitry, and more particularly relates to magnetic recording in a system having multiple read sensors.

BACKGROUND

The magnetic disk drive recording industry continues to pursue advances in technology that will sustain enhancements in recording density in a cost-effective manner. Two approaches currently under investigation are bit patterned media recording (BPMR) and heat-assisted magnetic recording (HAMR). An objective of these approaches is to overcome challenges posed by the super-paramagnetic limit that imposes a trade-off among three fundamentally competing recording parameters: media signal-to-noise ratio (SNR), writability, and thermal stability. BPMR and HAMR, however, require modifications to the media and heads, which significantly increase costs. Another technology, two-dimensional magnetic recording (TDMR), which uses conventional media and a new multiple-head configuration, relies on powerful signal processing in an attempt to achieve a theoretical limit of one bit-per-grain recording density.

As a practical near-term milestone, array-reader based magnetic recording (ARMR) has been proposed to increase areal density with an array-reader and associated signal processing.

SUMMARY

In accordance with one or more embodiments of the present invention, a method of mitigating an effect of track misregistration (TMR) on read performance in a system comprising an array-reader includes determining an estimated off-track condition, selecting a plurality of translation coefficients based on the estimated off-track condition, determining a plurality of updated equalizer coefficients by applying the plurality of translation coefficients to a plurality of native equalizer coefficients, and applying the updated equalizer coefficients to signals received from an array-reader to output a read signal. Other embodiments of the invention include, but are not limited to, being manifest as a TDMR read circuit fabricated as part of an integrated circuit, a method for improving read performance of a magnetic disk, and an electronic system. Additional and/or other embodiments of the invention are described in the following written description, including the claims, which is to be read in connection with the accompanying drawings.

BRIEF DESCRIPTION OF THE FIGURES

The following drawings are presented by way of example only and without limitation, wherein like reference numerals (when used) indicate corresponding elements throughout the several views, and wherein.

Figure 1:
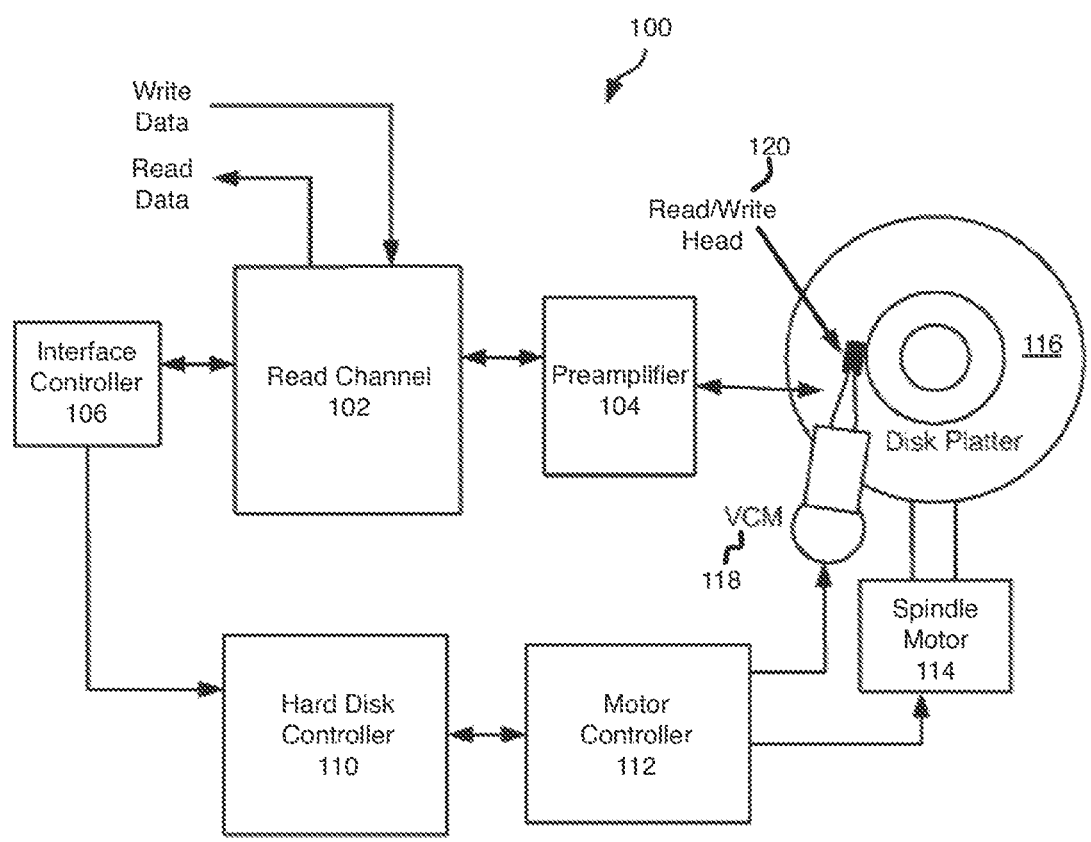
FIG. 1 depicts a storage device including an array-reader circuitry in accordance with one or more embodiments of the present invention.

It is to be appreciated that the drawings described herein are presented for illustrative purposes only. Moreover, common but well-understood elements and/or features that may be useful or necessary in a commercially feasible embodiment may not be shown in order to facilitate a less hindered view of the illustrated embodiments.

Written Description

Embodiments of the invention will be described herein in the context of illustrative array-reader based magnetic recording (ARMR) systems for use, for example, in a data storage application. It should be understood, however, that embodiments of the invention are not limited to these or any other particular ARMR arrangements. Rather, embodiments of the invention are more broadly applicable to techniques for improving performance of a magnetic storage device. In this regard, embodiments of the invention provide an apparatus and methodology for beneficially mitigating track misregistration (TMR). Moreover, it will become apparent to those skilled in the art given the teachings herein that numerous modifications can be made to the illustrative embodiments shown that are within the scope of the claimed invention. That is, no limitations with respect to the embodiments shown and described herein are intended or should be inferred.

As a preliminary matter, for purposes of clarifying and describing embodiments of the invention, the following table provides a summary of certain acronyms and their corresponding definitions, as the terms are used herein:

Table of Acronym Definitions

| Acronym | Definition |
| --- | --- |
| TMR | Track misregistration |
| BPMR | Bit Patterned Media Recording |

| Acronym | Definition |
| --- | --- |
| HAMR | Heat-Assisted Magnetic Recording |
| SNR | Signal-to-Noise Ratio |
| TDMR | Two-Dimensional Magnetic Recording |
| ARMR | Array-Reader Based Magnetic Recording |
| PMR | Perpendicular Magnetic Recording |
| AFE | Analog Front End |
| ACC | Alternating Current Coupling |
| CTF | Continuous-Time Filter |
| DFIR | Digital Finite Impulse Response |
| PR | Partial Response |
| NRZ | Non-Return to Zero |
| ASIC | Application Specific Integrated Circuit(s) |
| LUT | Look Up Table |
| CTS | Cross-Track Separation |
| DTS | Down-Track Separation |
| BER | Bit Error Rate |
| TP | Track Pitch |

As previously stated, one problem with bit patterned media recording (BPMR) and heat-assisted magnetic recording (HAMR) is that these approaches require substantial modifications to the media and heads, which significantly increases costs. ARMR is seen as an intermediate approach between current perpendicular magnetic recording (PMR) and two-dimensional magnetic recording (TDMR), which provides a significant increase in storage density compared to PMR while avoiding the challenges posed by BPMR and HAMR. ARMR uses standard media and an array of read-elements, also referred to herein as an array-reader, in conjunction with changes in read-back signal processing to achieve improved signal-to-noise ratio (SNR) of a track that is being read.

ARMR achieves an areal density gain by employing multi-dimensional joint signal processing of multiple read-back signals from the array reader. Embodiments of the invention are shown and described herein in the context of an array-reader including two read-elements (i.e., readers). It is to be understood that embodiments of the invention are not limited to two read-elements based array-reader and that the principle behind the invention can be extended to array-readers with more than 2 read-elements.

TDMR is a recording architecture intended to support storage densities beyond those of conventional recording systems. TDMR utilizes multiple read-elements to read from multiple adjacent tracks and uses joint signal processing and detection to decode the signal from a target track. The gains achieved from TDMR come primarily from more powerful coding and signal processing algorithms that allow data bits to be stored more densely on a magnetic storage medium (e.g., disk). In traditional disk architectures with a single read-element, reading a single sector of the magnetic storage medium with TDMR generally involves reading the sector at multiple off-track locations, requiring additional disk rotations. To circumvent this problem, TDMR disk drives may use multiple read-elements, also referred to as an array-reader, on the same support arm, typically referred to as a slider, thus restoring traditional read service times through ARMR processes.

In accordance with one or more embodiments of the present invention, ARMR and TDMR can be implemented in conjunction with other advanced technologies as well. For example, ARMR/TDMR can be used for BPMR where track pitch and bit density are high.

Turning to FIG. 1, a storage system 100 including a read channel circuit 102 having TMR mitigation circuitry is shown in accordance with one or more embodiments of the present invention. Storage system 100 also includes a preamplifier 104, an interface controller 106, a hard disk controller 110, a motor controller 112, a spindle motor 114, a disk platter 116, and a read/write head assembly 120. The read/write head assembly 120 includes an array of readers (array-reader) or multiple read sensors in ARMR. In one embodiment, the interface controller 106 controls addressing and timing of data to and from the disk platter 116. The data on the disk platter 116 can be stored in the form of magnetic signals recorded in accordance with either a longitudinal or a perpendicular recording scheme. The data can be recovered or detected by the read/write head assembly 120 when the assembly is properly positioned over the disk platter 116. In one embodiment, the read/write head assembly 120 includes a voice coil motor (VCM) control module 118. The position of the read/write head assembly 120 can be determined by the motor controller 112, the VCM control module 118, a dedicated sensor (not explicitly shown, but implied), etc. It is to be understood that embodiments of the invention are not limited to any specific storage system and that this disclosure is intended to cover any and all adaptations or variations of various embodiments configured to perform operations for TMR mitigation.

The array-reader 120 of ARMR systems output more than one reader signal. In one or more embodiments, these reader signals are sent by a transmission line (not explicitly shown, but implied) to a preamplifier 104 and subsequently from the preamplifier 104 to a read channel 102 where signal processing takes place.

The array-reader of an ARMR system facilitates enhanced recording capacity (e.g., increased areal density) in hard disk drives. During a read event, the array-reader can land on a track at an offset from an expected array-reader position, resulting in a mismatch of joint equalizer coefficients to an incoming read-back signal.

The joint equalizer coefficients are taps of a digital finite impulse response (DFIR) filter. The DFIR filters output a weighted sum of a current and a finite number of previous values (taps) of an input. It should be understood that embodiments of the present invention are not limited to DFIR filters and that one or more embodiments of the present invention can be implemented with FIR filters.

In cases where the joint equalizer does not reflect the actual offset in array-reader location, performance of loops, accuracy in signal equalization, and consequently the quality of signal going into the detector can be compromised. This TMR can happen, for example, from sector-to-sector or when the array-reader arrives at a new track at the beginning of a read operation.

In accordance with one or more embodiments of the present invention, a mitigation approach takes native equalizer coefficients for expected array-reader positions stored in a zone-table, or alternative storage element, and generates new equalizer coefficients using the native equalizer coefficients and side information on an actual off-track condition, where the side information on actual off-track condition is used to determine translation coefficients between the native equalizer coefficients and the new equalizer coefficients. A look-up table (LUT), or alternative storage element, stores the translation coefficients for a plurality of off-track conditions. When the array-reader lands on a track, an estimate of the off-track condition or offset is determined using the readback signals (e.g., a track preamble and/or a sync-mark field) from the media and a new equalizer configuration is generated for the offset using the native equalizer coefficients and the translation coefficients. It is to be noted that in the written description, the terminologies "off-track," "read-offset" and "offset" will be used interchangeably to describe an error in the location of the array-reader compared to the expected head location on the track.

In accordance with one or more embodiments of the present invention, the translation coefficients of the mitigation approach can be determined as follows.

Let $W_0 = [\underline{w}_{0,1} \ \underline{w}_{0,2}]$ be the joint equalizer for a 2-reader ARMR at a nominal (i.e., expected) off-track condition.

Let $W_\theta = [\underline{w}_{\theta,1} \underline{w}_{\theta,2}]$ be the joint equalizer for a 2-reader ARMR at an actual off-track condition (i.e., different from nominal or expected location) in a particular sector of the magnetic storage medium.

Determine an estimate of $W_\theta$ as a linear combination of the equalizer filters in $W_0$ as $$\underline{w}_{\theta,1} \approx \alpha_{1,1} \cdot \underline{w}_{0,1} + \alpha_{2,1} \cdot \underline{w}_{0,2} = W_0 \cdot \begin{bmatrix} \alpha_{1,1} \\ \alpha_{2,1} \end{bmatrix},$$

$$\underline{w}_{\theta,2} \approx \alpha_{1,2} \cdot \underline{w}_{0,1} + \alpha_{2,2} \cdot \underline{w}_{0,2} = W_0 \cdot \begin{bmatrix} \alpha_{1,2} \\ \alpha_{2,2} \end{bmatrix}$$

$$\Rightarrow W_\theta \approx W_0 \cdot A_\theta, \text{ where } A_\theta = \begin{bmatrix} \alpha_{1,1} & \alpha_{1,2} \\ \alpha_{2,1} & \alpha_{2,2} \end{bmatrix}.$$

Determine the translation coefficients matrix $A_\theta$ by minimizing an estimation error to obtain $A_\theta = W_0^\# \cdot W_\theta$, where $W_0^\#$ is the pseudo-inverse of $W_0$ which can be written as:

$$W_0^\# = (W_0^T W_0)^{-1} W_0^T = \frac{1}{\Delta} \cdot \begin{bmatrix} \underline{w}_{0,2}^T \underline{w}_{0,2} & -\underline{w}_{0,1}^T \underline{w}_{0,2} \\ -\underline{w}_{0,1}^T \underline{w}_{0,2} & \underline{w}_{0,1}^T \underline{w}_{0,1} \end{bmatrix},$$

$$\Delta = (\underline{w}_{0,1}^T \underline{w}_{0,1}) \cdot (\underline{w}_{0,2}^T \underline{w}_{0,2}) - (\underline{w}_{0,1}^T \underline{w}_{0,2})^2.$$

An estimate of $W_\theta$ using the joint equalizer $W_0$ then can be obtained as $\hat{W}_\theta = W_0 \cdot A_\theta$. A LUT comprising the translation coefficients matrix $A_\theta$ for various off-track conditions and the joint equalizer $W_0$ for the nominal off-track condition are stored in a memory. In one embodiment of the present invention, the LUT and the joint equalizer $W_0$ are stored in the zone table of the hard disk drive.

Figure 2:
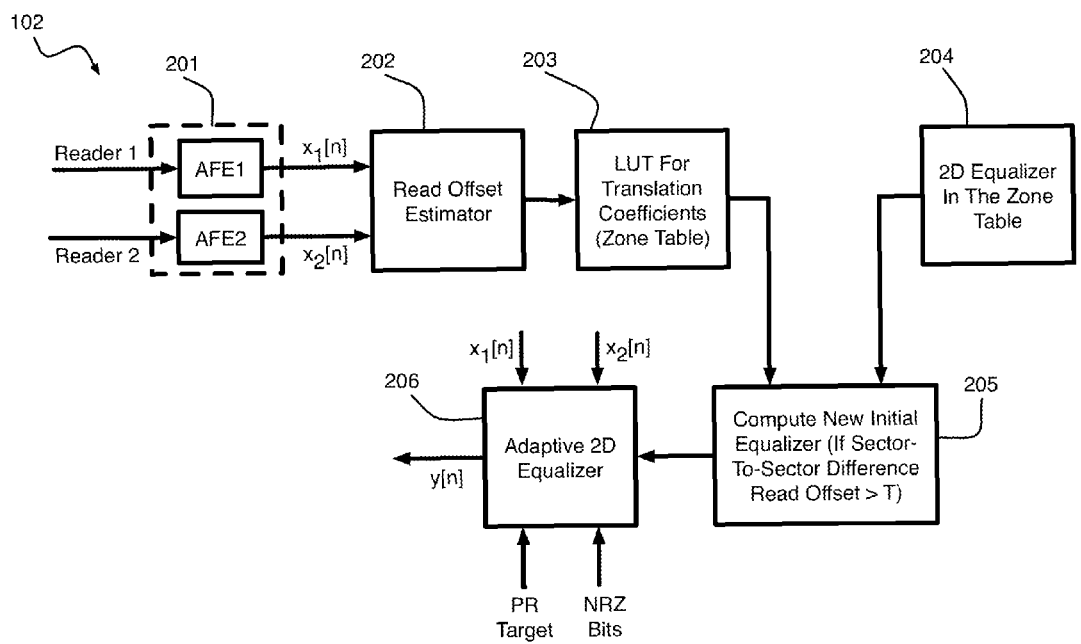
FIG. 2 illustrates an array-reader circuitry including an adaptive joint equalizer in accordance with one or more embodiments of the present invention.

In accordance with one or more embodiments of the present invention, FIG. 2 shows a read channel 102 comprising an analog front end (AFE) 201, a read offset estimator 202, at least one memory (not explicitly shown, but implied) storing a LUT 203 for translation coefficients and a zone table 204 comprising joint equalizer coefficients, and a module 205 configured to determine updated equalizer coefficients for a case where a difference in the read offset (e.g., sector-to-sector) is greater than a threshold (T). The read channel 102 further includes an adaptive joint equalizer 206 configured to implement the updated equalizer coefficients as the initial values for adaptive equalization.

The AFE receives signals from corresponding read heads of the array-reader and outputs respective conditioned signals $x_1[n]$ and $x_2[n]$. The AFE includes, for example, an alternating current coupling (ACC) (e.g., capacitor) operating as a high-pass filter to remove any direct current offset in the signal, a continuous time filter (CTF) operating to filter undesirable noise from the received analog signal, and an analog-to-digital converter that converts the continuous analog signal into a series of corresponding digital samples. The AFE 201 outputs the conditioned signals to the read offset estimator 202.

The read offset estimator 202 outputs an estimated value of the read-offset or off-track location of the array-reader. According to an embodiment of the present invention, this estimation of the read-offset (or off-track) is made based on the readback signals $x_1[n]$ and $x_2[n]$, or the read-offset is estimated and supplied by some other module in the read channel. In yet another embodiment, the estimation of the read-offset (or off-track) is estimated based on servo signals.

Based on the estimate of the read-offset or off-track, translation coefficients are determined from the LUT 203. For a case where difference in the read offset from previous sector to current sector is greater than a threshold T, the module 205 determines updated equalizer coefficients using the translation coefficients and the joint equalizer from the zone table. In case the threshold test fails, the equalizer coefficients from the previous sector are retained for current sector. If the current sector happens to be the first sector in a new track being read, the threshold T is applied to the difference between the expected read-offset and estimated off-track. If the threshold test fails, the equalizer coefficients are set to the joint equalizer obtained from the zone table without applying the translation coefficients.

More particularly, the module 205 uses an estimated off-track condition to choose translation coefficients from the LUT 203. According to an embodiment of the present invention, if the estimated off-track condition is not available in the LUT (e.g., an unspecified off-track condition), an interpolation approach is used to determine the translation coefficients for the estimated off-track condition using the estimated off-track conditions specified in the LUT. In one or more embodiments, the LUT is configured to store a polynomial description of the translation coefficients as a function of the off-track condition.

In accordance with one or more embodiments of the present invention, the adaptive joint equalizer 206 receives equalizer coefficients (i.e., either the updated equalizer coefficients after translation or the native equalizer coefficients from the zone table or the equalizer coefficients from the previous sector, depending on the read offset) from the module 205 to be used as the initial taps for equalization and the conditioned signals $x_1[n]$ and $x_2[n]$ from the AFE 201 and outputs a read signal y[n]. According to an exemplary embodiment of the present invention, the adaptive joint equalizer 206 also receives a Partial Response (PR) target and non-return-to-zero (NRZ) bits.

In accordance with one or more embodiments of the present invention, an equalizer adaptation can be applied during operation of the read channel to fine-tune the equalizer coefficients.

In accordance with one or more embodiments of the present invention, the mitigation approach is supplemented by an averaging approach, wherein the equalizer $W_0$ stored in the zone-table is selected as an average of the joint equalizers for a plurality of offsets around a track-center. This example is referred to here as the averaging plus translation approach.

In accordance with one or more embodiments of the present invention, either the mitigation approach or the averaging plus translation approach can be applied in a case where data is written with a squeeze (e.g., track overlap) happening because of TMR during the write process.

Figure 3:
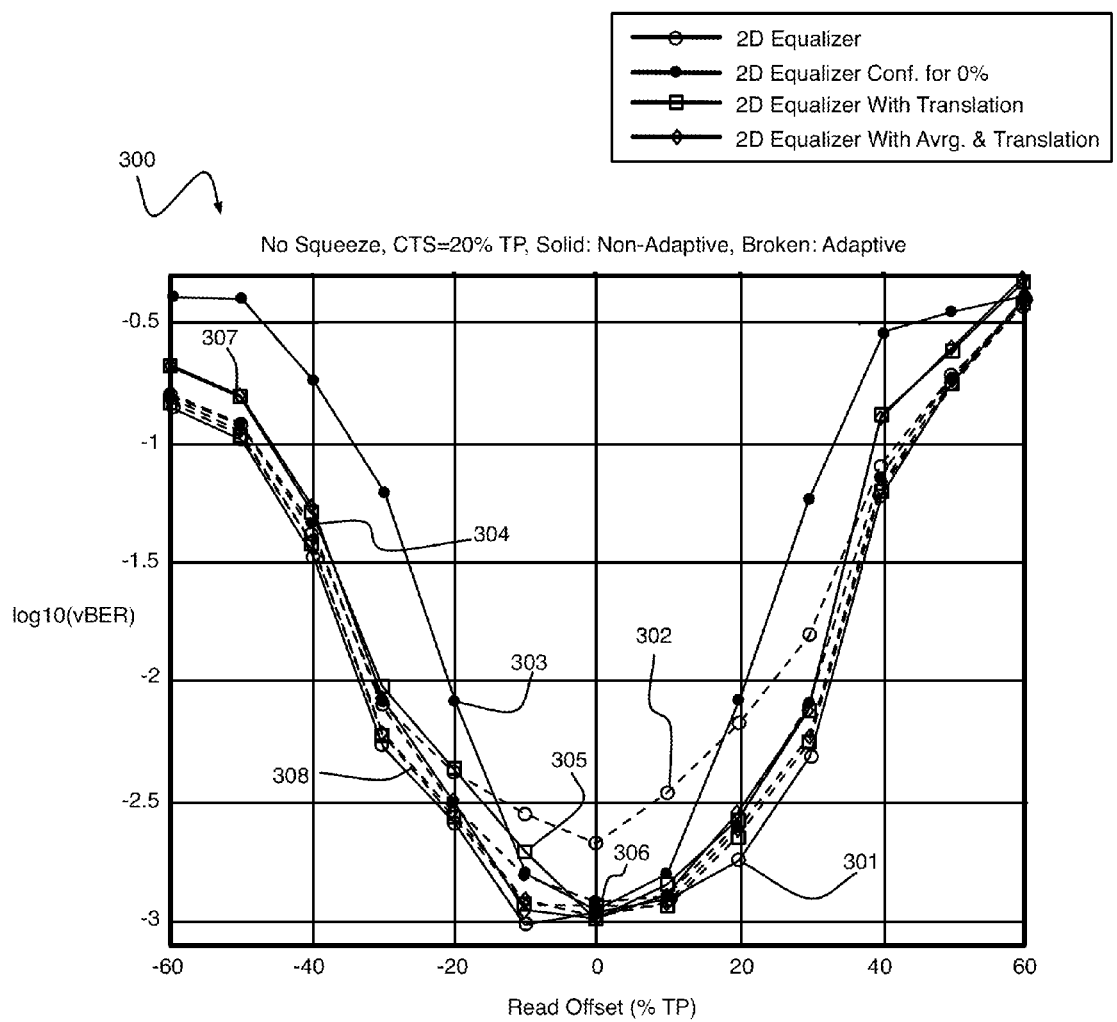
FIG. 3 is a graph of different simulation results for an offset condition in accordance with one or more embodiments of the present invention.

FIG. 3 is a graph 300 depicting different exemplary simulation results (e.g., bit error rate (BER)) for an offset condition, in accordance with one or more embodiments of the present invention. In FIG. 3, plot 301 shows the target performance obtained by using a reference equalizer having coefficients for each read-offset (non-adaptive equalization) and plot 302 shows the performance when adaptive equalization with zero initialization is used. Plots 303 and 304 show the performance of an equalizer configured for 0% read-offset at all read-offsets (non-adaptive equalization and adaptive equalization with an initialization based on the equalizer in the non-adaptive case). Plots 305 and 306 show the performance of a translation equalizer configured for 0% read-offset to other read-offsets using knowledge of read-offset, wherein the system stores one joint equalizer and a look-up table with four translation coefficients for each off-track condition (non-adaptive equalization and adaptive equalization with an initialization based on the equalizer in the non-adaptive case). Plots 307 and 308 shows the performance of a translation equalizer configured based on the average of equalizers configured for −30% to +30% read-offsets to other read-offsets using the knowledge of read-offset, wherein the system stores one average of joint equalizer and a look-up table with four translation coefficients for each off-track condition (non-adaptive equalization and adaptive equalization with an initialization based on the equalizer in the non-adaptive case).

Figure 4:
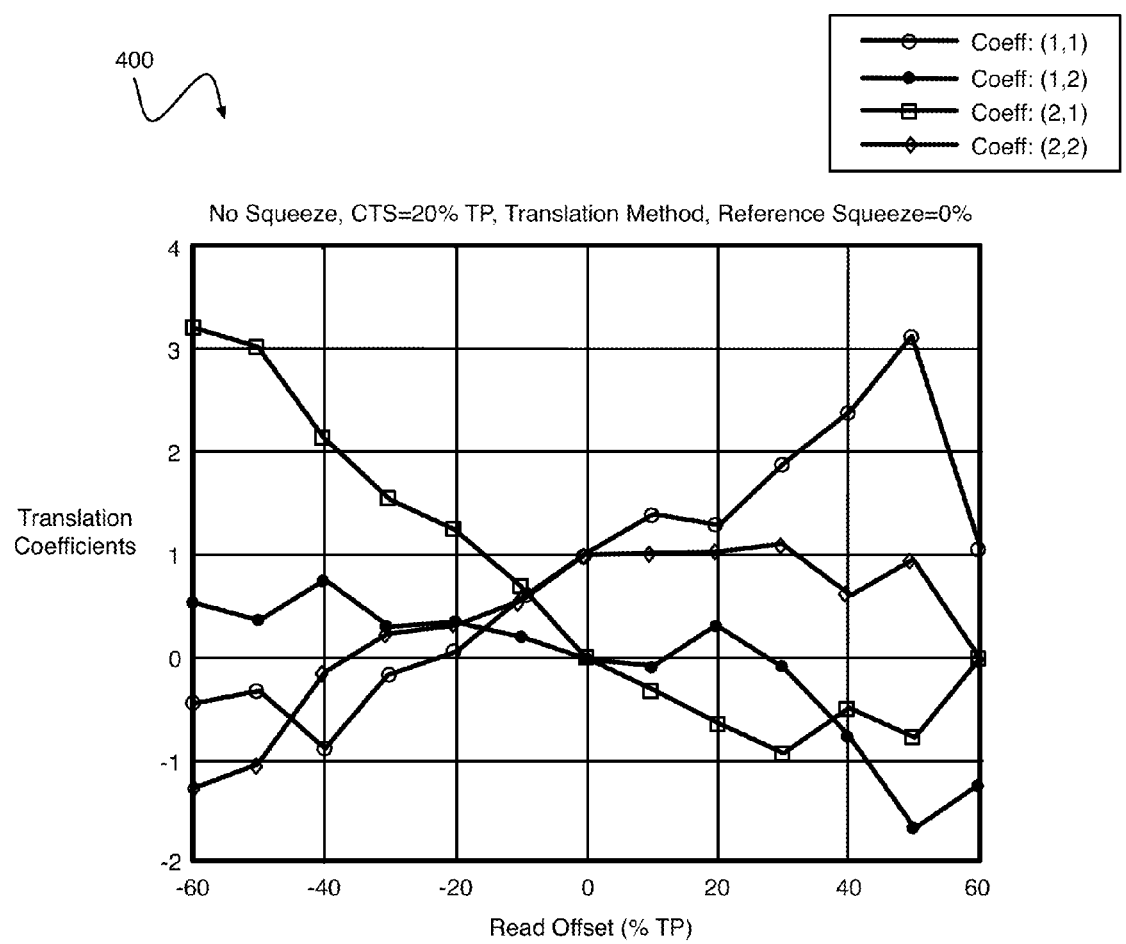
FIG. 4 illustrates an exemplary look-up table (LUT) in accordance with one or more embodiments of the present invention.

FIG. 4 is a graph 400 illustrating an exemplary LUT storing read offset conditions (% track pitch (TP)) and corresponding translation coefficients in accordance with one or more embodiments of the present invention. In FIG. 4, 'Coeff: (1,1)', 'Coeff: (1,2)', 'Coeff: (2,1)' and 'Coeff: (2,2)' correspond to translation coefficients $\alpha_{1,1}$, $\alpha_{1,2}$, $\alpha_{2,1}$ and $\alpha_{2,2}$, respectively, in the coefficient matrix $A_\theta$.

Figure 5:
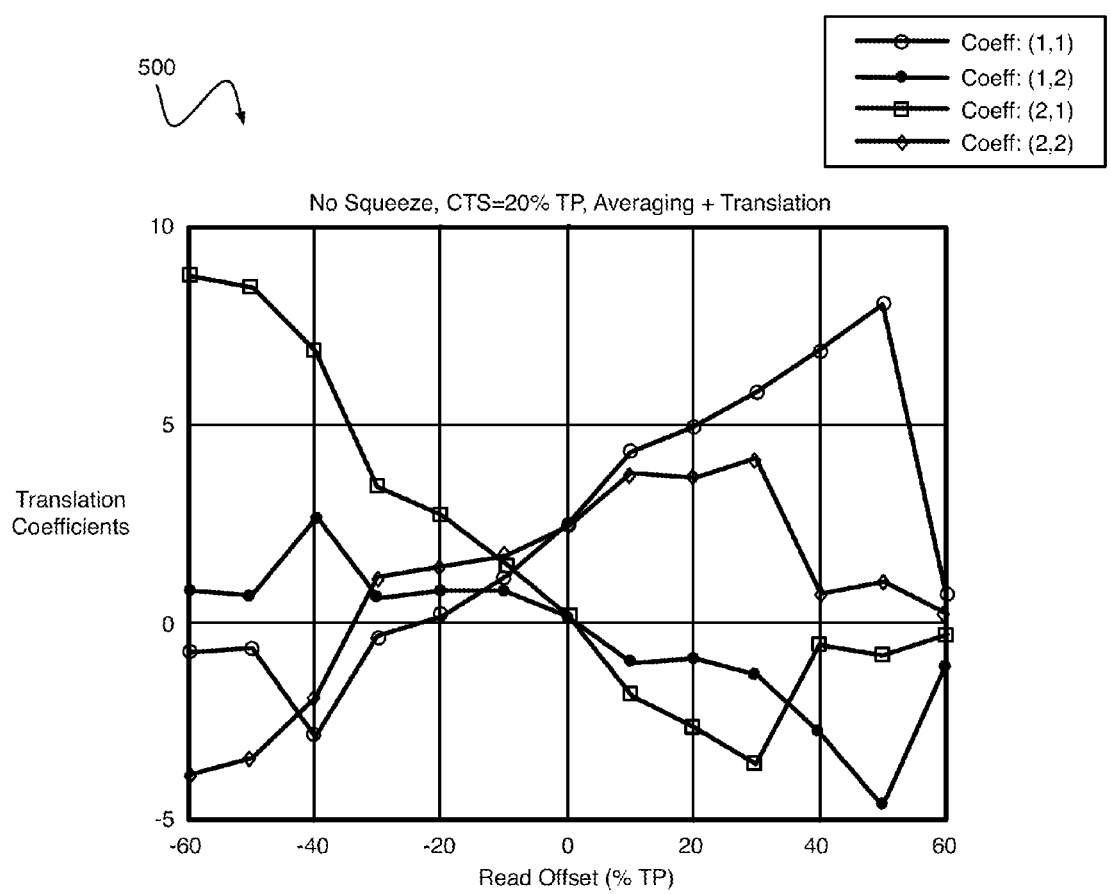
FIG. 5 illustrates another exemplary LUT in accordance with one or more embodiments of the present invention.

FIG. 5 is a graph 500 illustrating an exemplary LUT storing read offset conditions (% TP) and corresponding translation coefficients for an averaging and translation based implementation in accordance with one or more embodiments of the present invention.

Figure 6:
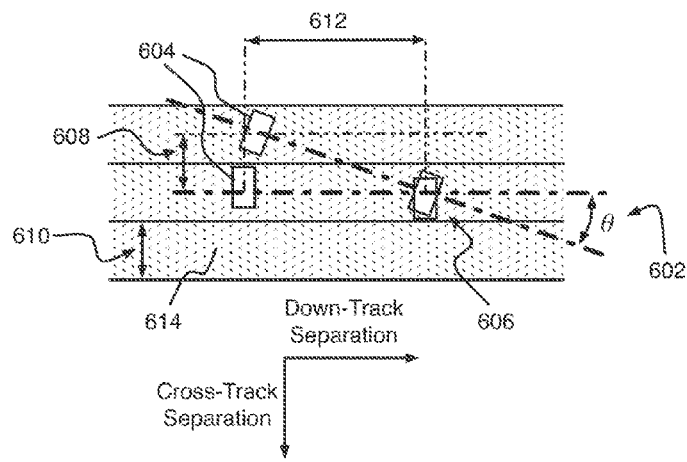
FIG. 6 illustrates skew angle and reader Cross-Talk Separation (CTS) in accordance with one or more embodiments of the present invention.

In FIGS. 3, 4 and 5, reference is made to cross-track separation (CTS) conditions (i.e., CTS=20% TP). As shown in FIG. 6, CTS 608 varies with skew angle 602. In FIG. 6, an array-reader is illustrated being disposed at two different skew angles; namely, 0 and θ degrees. It follows that the difference between the two different skew angles is θ 602. The array-reader includes two readers, 604 and 606, shown disposed relative to one another for each of the two skew angles. A certain CTS 608 occurs between the two readers given the skew angle θ. Note, that down-track separation (DTS) 612 decreases with increasing skew angle. It should also be understood that, in one or more embodiments, CTS and DTS are measured in terms of TP 610, shown here in connection with track 614.

In accordance with one or more embodiments of the present invention, a Gaussian cross-track profile based TMR sensitive initialization of the ARMR joint equalizer can be performed. In this example, two readers are reading the same media magnetization (i.e., data) with different weights due to different cross-track locations. Zero read-offset equalizers can be decomposed into a weighted sum of two equalizers, where coefficients are obtained based on Gaussian profiles. The off-track initial equalizers can be determined by a weighted sum of decomposed equalizers, where weights can be determined based on the Gaussian profiles (see FIGS. 7 and 8).

For example, consider a case where $CTS_0$=0.2 TP, where $CTS_0$ is the CTS at zero skew, and given a width of the Gaussian profiles is 0.11 TP and a given effective track width is 0.5 TP.

Figure 7:
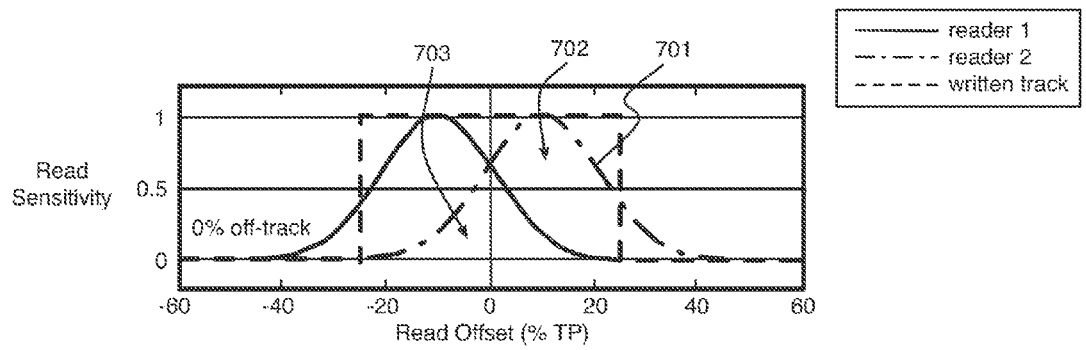
FIG. 7 illustrates Gaussian cross-track profiles in accordance with one or more embodiments of the present invention.

Referring to FIG. 7, at 0 off-track, obtain vectors $\underline{w}_{0,L}$ and $\underline{w}_{0,R}$ by performing the following decomposition:

$$\underline{w}_{0,L}=0.8018\underline{w}_{0,1}+0.1982\underline{w}_{0,2} \quad (1)$$

$$\underline{w}_{0,R}=0.1982\underline{w}_{0,1}+0.8018\underline{w}_{0,2} \quad (2)$$

where L and R refer to the left and right of a written track, respectively. The coefficients appearing on the right-side of equations (1) and (2) (i.e., right of the equals sign) correspond to normalized areas of the left and right regions of the Gaussian sensitivity function at 0 read offset within the written track. For example, consider curve 701 showing a Gaussian sensitivity of reader 2 for 0 read offset divided into a first area 702 representing a 0.8018 fraction of the total area of the curve 701 within the written track (i.e. area of the sensitivity function for read-offsets 0% to 25%) and a second area 703 representing a 0.1982 fraction of the total area of the curve 701 within the written track (e.g., area of the sensitivity function for read-offsets −25% to 0%), both areas normalized by the total area within −25% to +25%.

Figure 8:
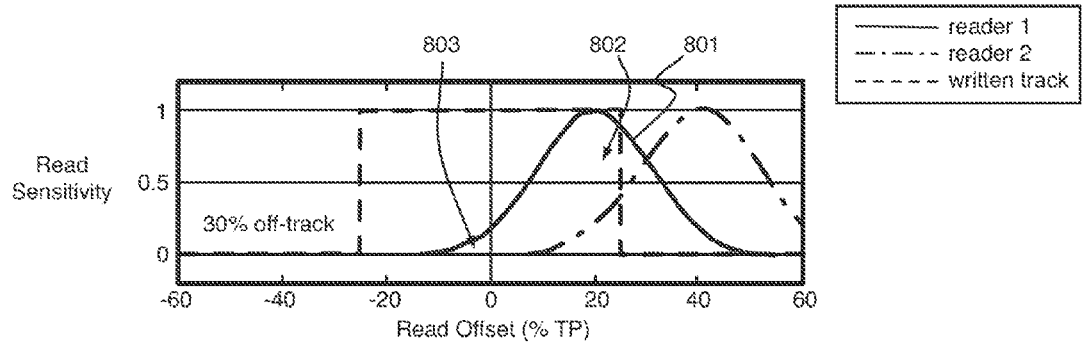
FIG. 8 illustrates another set of Gaussian cross-track profiles in accordance with one or more embodiments of the present invention.

Referring to FIG. 8, at 30% TP off-track, obtain vectors $\underline{w}_{0.3,L}$ and $\underline{w}_{0.3,R}$ by performing the following decomposition following the same approach as in Equations (1) and (2):

$$\underline{w}_{0.3,L}=g_{0.3,1}\times 0.0511\underline{w}_{0.3,1}+g_{0.3,2}\times 0.0016\underline{w}_{0.3,2} \quad (3)$$

$$\underline{w}_{0.3,R}=g_{0.3,1}\times 0.9489\underline{w}_{0.3,1}+g_{0.3,2}\times 0.9984\underline{w}_{0.3,2} \quad (4)$$

where L and R refer to the left and right of a written track, respectively. Consider curve 801 showing a Gaussian sensitivity of reader 1 divided into a first area 802 representing a 0.9489 fraction of the total area of the curve 801 within the written track and a second area 803 representing a 0.0511 fraction of the total area of the curve 701 within the written track. In Equations (3) and (4), weights $g_{0.3,1}$=0.5639 and $g_{0.3,2}$=4.4125 are introduced to re-weight the reader contributions from the off-track location and the numerical coefficients are left and right contributions of the normalized cross-section at 30% TP off-track, respectively. The re-weighting factors $g_{0.3,1}$ and $g_{0.3,2}$ are obtained as:

$$g_{0.3,1}=(e_{0.3,1}+e_{0.3,2})/(2e_{0.3,1})$$

$$g_{0.3,2}=(e_{0.3,1}+e_{0.3,2})/(2e_{0.3,2})$$

where $e_{0.3,1}$=0.6753 and $e_{0.3,2}$=0.0863 are the areas of reader 1 and reader 2 Gaussian sensitivity functions within the written track (e.g., area of effective written magnetization). A matrix inversion of Equations (3) and (4) yields, $$\underline{w}_{0.3,1}=35.7682\underline{w}_{0.3,L}-0.0573\underline{w}_{0.3,R} \quad (5)$$

$$\underline{w}_{0.3,2}=-4.3444\underline{w}_{0.3,L}+0.2340\underline{w}_{0.3,R} \quad (6)$$

The left and right contributions are re-weighted as a function of off-track as, $$\underline{w}_{0.3,L}=b_{0.3,L}\underline{w}_{0,L}=(0.0511+0.0016)\underline{w}_{0,L}=0.0527\underline{w}_{0,L} \quad (7)$$

$$\underline{w}_{0.3,R}=b_{0.3,R}\underline{w}_{0,R}=(0.9489+0.9984)\underline{w}_{0,R}=1.9473\underline{w}_{0,R} \quad (8)$$

where $b_{0.3,L}$ and $b_{0.3,R}$ are summations of the normalized cross-sections used for representing $\underline{w}_{0.3,L}$ and $\underline{w}_{0.3,R}$ (see FIG. 8). Combining equations (5) to (8) with Equations (1) and (2), the off-track equalizer coefficients are represented by the nominal equalizer coefficients, $$\underline{w}_{0.3,1}=1.4893\underline{w}_{0,1}+0.2841\underline{w}_{0,2}$$

$$\underline{w}_{0.3,2}=-0.0933\underline{w}_{0,1}+0.3200\underline{w}_{0,2}.$$

In this example the four equalizer coefficients are obtained based on zero read-offset equalizers and a Gaussian profile. This approach may also be used to determine the translation coefficients to be stored in a LUT.

Figure 9:
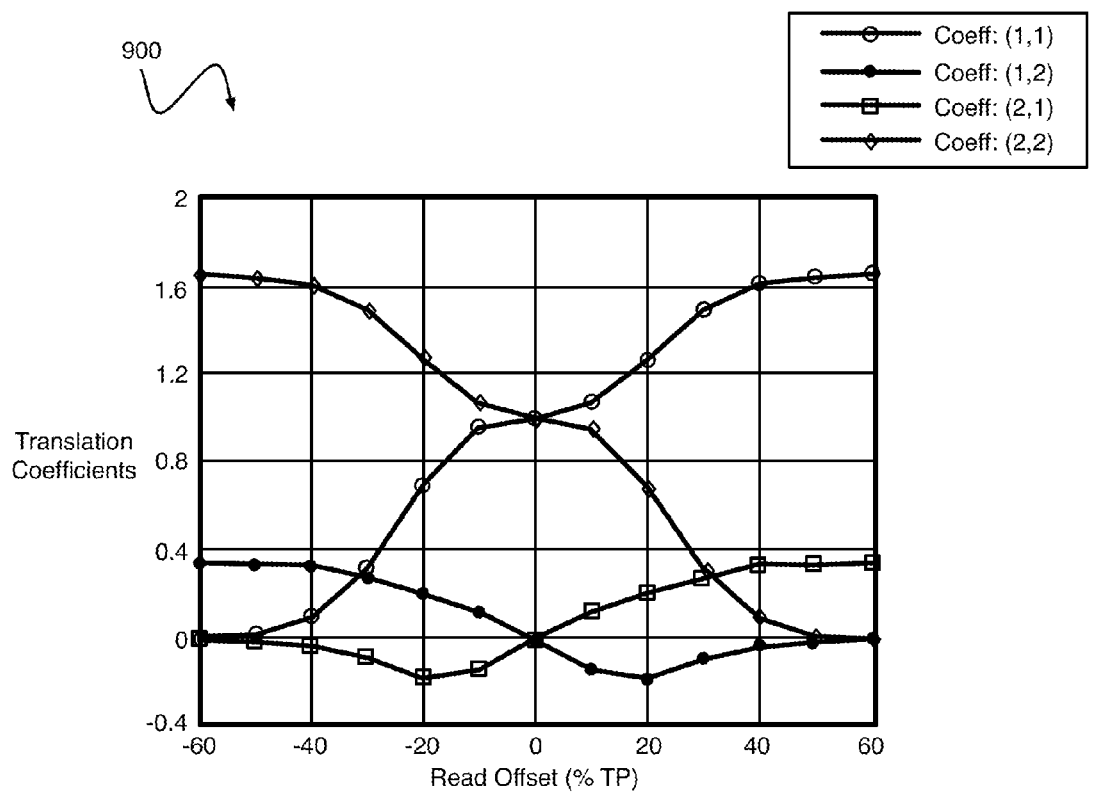
FIG. 9 illustrates an exemplary LUT in accordance with one or more embodiments of the present invention.

Referring to FIG. 9, illustrating a LUT in the form of a graph 900, an estimate of the equalizer at the read-offset θ can be determined based on the reference equalizer at read-offset 0 as:

$$w_{\theta,1} = c_{(1,1)}w_{0,1} + c_{(1,2)}w_{0,2}$$

$$w_{\theta,2} = c_{(2,1)}w_{0,1} + c_{(2,2)}w_{0,2}.$$

where $c_{(1,1)}$, $c_{(1,2)}$, $c_{(2,1)}$ and $c_{(2,2)}$ are the required translation coefficients shown in FIG. 9 for each read-offset θ determined based on the Gaussian reader profile approach described above.

Figure 10:
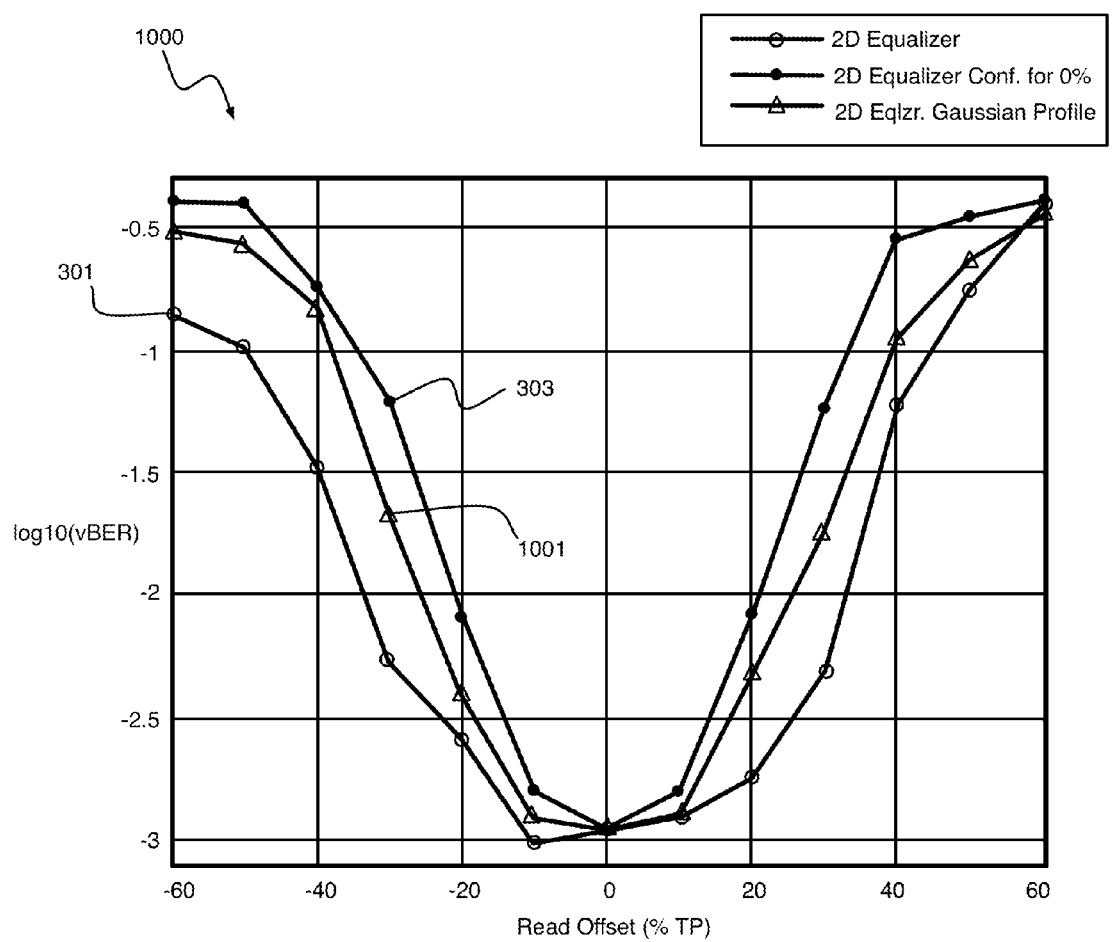
FIG. 10 is a graph of different simulation results for an offset condition in accordance with one or more embodiments of the present invention.

FIG. 10 is a graph 1000 depicting different exemplary simulation results (e.g., bit error rate (BER)) for an offset condition, in accordance with one or more embodiments of the present invention. In FIG. 10, plot 301 shows the target performance obtained by using a reference equalizer having coefficients for each read-offset (non-adaptive equalization). Plot 303 shows the performance of an equalizer configured for 0% read-offset at all read-offsets (non-adaptive equalization). Plot 1001 shows the performance of a translation equalizer configured with equalizer coefficients obtained based on zero read-offset equalizers and a Gaussian profile.

As will be appreciated by one skilled in the art, embodiments of the present invention may be implemented as an apparatus, system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, embodiments of the present invention may take the form of a computer program product embodied in one or more non-transitory machine-readable medium(s) having machine-readable program code embodied thereon.

The block diagrams in the figures depict illustrative architectures, functionality, and operation of implementations of systems, methods and computer program products according to embodiments of the present invention. In this regard, each block shown in the block diagrams may represent a module, segment, or portion of code, which comprises one or more executable instructions for implementing specified functions. It should also be noted that, in one or more embodiments, functions represented by the blocks may occur out of the order noted in the figures. For example, two blocks shown in succession may, in fact, be executed substantially concurrently, or the blocks may sometimes be executed in the reverse order, depending upon the functionality involved. It will also be appreciated that each block of the block diagrams, and combinations of blocks in the block diagrams, can be implemented by special purpose hardware-based systems that perform the specified functions or acts, or combinations of special purpose hardware and computer instructions.

It should be understood that any of the methods described herein can include an additional step of providing a system comprising distinct software modules embodied on a non-transient computer-readable storage medium; the modules include, in one or more embodiments, any or all of the elements depicted in the block diagrams and/or described herein; by way of example and not limitation, a first module shaping a plurality of signals (see for example, block 201, FIG. 2), a second module estimating a read-offset from the plurality of signals (see for example, block 202, FIG. 2), and a third module outputting a set of updated equalizer coefficients to initialize the coefficients of an adaptive joint equalizer (see for example, block 205, FIG. 2). The method steps can then be carried out using the distinct software modules and/or sub-modules of the system, executing on one or more hardware processors. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

In an integrated circuit implementation of one or more embodiments of the invention, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

Figure 11:
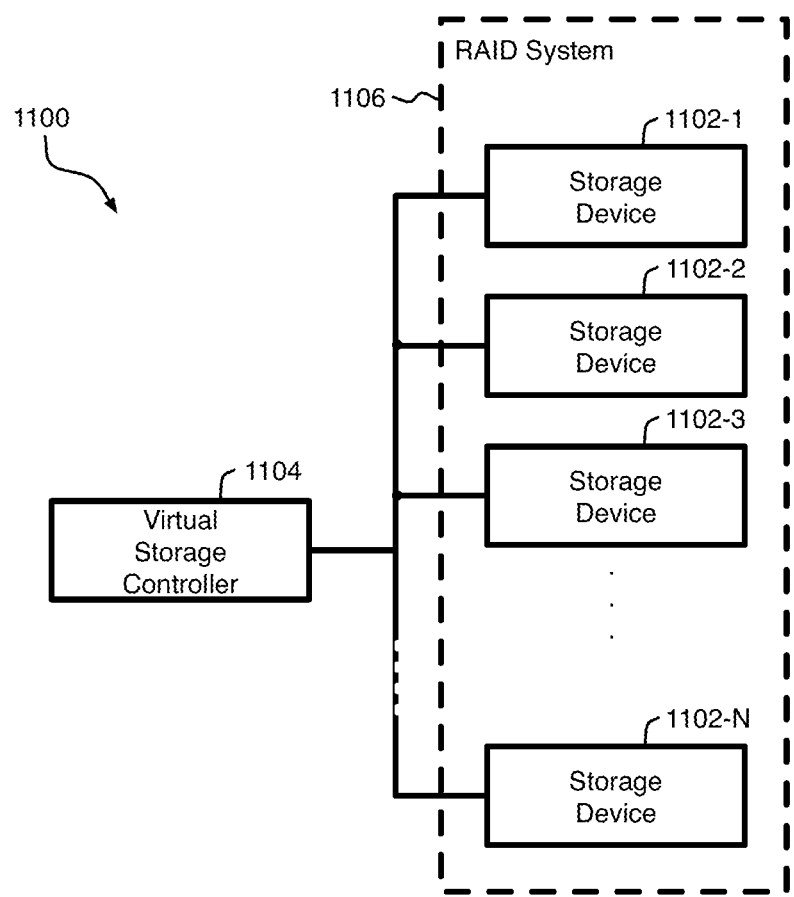
FIG. 11 is a block diagram depicting at least a portion of an exemplary virtual storage system comprising multiple storage devices, at least one of the storage devices incorporating techniques for implementing an adaptive joint equalizer according to an embodiment of the invention.

Embodiments of the invention are suitable for use in conjunction with a virtual storage system 1100 comprising multiple storage devices 1102-1 through 1102-N, possibly of multiple different types, as illustrated in FIG. 11. For example, the storage devices 1102-1 through 1102-N may be implemented using all hard disk drives (HDDs), all solid-state drives (SSDs), or using a combination of one or more HDDs and one or more SSDs. Other storage device types are similarly contemplated. The virtual storage system 1100, also referred to as a storage virtualization system, illustratively comprises a virtual storage controller 1104 coupled with a redundant array of independent devices (RAID) system 1106. As will be known by those skilled in the art, RAID is a storage technology that provides increased reliability, among other features, through redundancy. This is accomplished by combining multiple physical storage components (e.g., HDDs, SSDs, etc.) into a logical (i.e., virtual) unit, where data is distributed across the multiple storage components in one of a plurality of ways, generally referred to as "RAID levels." The RAID system 1106 more specifically comprises N distinct storage devices denoted 1102-1, 1102-2, . . . 1102-N, where N is an integer greater than one. As previously stated, all storage devices 1102-1 through 1102-N need not be of the same type. Furthermore, one or more of the storage devices 1102-1 through 1102-N of the RAID system 1106 are assumed to be configured to include apparatus and/or circuitry as disclosed herein. These and other virtual storage systems comprising multiple storage devices (e.g., HDDs, SSDs, or some combination of HDDs and SSDs), are considered embodiments of the invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method of mitigating an effect of track misregistration on read performance in a system comprising an array-reader, comprising: determining an estimated off-track condition; selecting a plurality of translation coefficients based on the estimated off-track condition; determining a plurality of updated equalizer coefficients by applying the plurality of translation coefficients to a plurality of native equalizer coefficients; and applying the updated equalizer coefficients to signals received from the array-reader to output a read signal.

2. The method of claim 1, wherein the estimated off-track condition is determined from a plurality of readback signals of the array-reader.

3. The method of claim 1, further comprising conditioning the determination of the estimated off-track condition on detecting the array-reader moving to a new sector of a magnetic storage medium.

4. The method of claim 1, further comprising conditioning the determination of the estimated off-track condition on detecting the array-reader moving to a new track to begin a read operation of a magnetic storage medium.

5. The method of claim 1, further comprising conditioning the selection of the plurality of translation coefficients on a comparison of the estimated off-track condition to a threshold of read-offset for determining the updated equalizer coefficients.

6. The method of claim 5, wherein the threshold of read-offset is applied to a difference between an expected read-offset and the estimated off-track condition upon determining that a current sector is a first sector in a new track being read.

7. The method of claim 1, further comprising storing the plurality of translation coefficients in a look-up table with respective estimated off-track conditions, including the estimated off-track condition.

8. The method of claim 7, wherein selecting the plurality of translation coefficients based on the estimated off-track condition comprises interpolating one or more of the plurality of translation coefficients for an unspecified off-track condition.

9. The method of claim 7, wherein the plurality of translation coefficients are stored in the look-up table in a form of a polynomial description of the plurality of translation coefficients as function of the estimated off-track condition.

10. The method of claim 1, wherein the plurality of translation coefficients are determined from a Gaussian profile of cross-track sensitivity within a written track.

11. The method of claim 10, wherein a plurality of contributions of the Gaussian profile are determined for each of a plurality of readers of the array-reader.

12. The method of claim 11, wherein the plurality of contributions of the Gaussian profile are weighted to re-weight the plurality of contributions from at least one off-track location of the plurality of readers.

13. A storage system comprising: an array-reader configured to generate a plurality of signals; and a read channel configured to adaptively determine equalizer coefficients based on an estimated off-track condition of the array-reader, wherein the equalizer coefficients are applied to the plurality of signals received from the array-reader to output a read signal.

14. The storage system of claim 13, further comprising a memory storing the plurality of translation coefficients as function of the estimated off-track condition and a plurality of native equalizer coefficients.

15. The storage system of claim 13, further comprising a memory storing the plurality of translation coefficients in a form of a Gaussian profile of cross-track sensitivity within a written track.

16. The storage system of claim 13, further comprising a memory storing the plurality of translation coefficients in a form of a polynomial description of the plurality of translation coefficients as function of the estimated off-track condition.

17. The storage system of claim 13, wherein the read channel comprises a read offset estimator configured to determine the estimated off-track condition of the array-reader.

18. The storage system of claim 13, further comprising an analog front end receiving the plurality of signals from the array-reader and outputting respective conditioned signals to the read channel.

19. A data storage system, comprising: a plurality of storage devices, wherein at least one of the plurality of storage devices comprises: an array-reader configured to generate a plurality of signals; and a read channel configured to adaptively determine equalizer coefficients based on an estimated off-track condition of the array-reader, wherein the equalizer coefficients are applied to the plurality of signals received from the array-reader to output a read signal.

20. The data storage system of claim 19, wherein the at least one of the plurality of storage devices is configured as a device in a redundant array of independent devices (RAID) system.

* * * * *